July 13, 1965    A. P. WEHNER    3,194,236
PORTABLE ELECTRO-AEROSOL GENERATOR
Filed Dec. 26, 1961

ALFRED P. WEHNER
INVENTOR.

United States Patent Office 3,194,236
Patented July 13, 1965

3,194,236
PORTABLE ELECTRO-AEROSOL GENERATOR
Alfred P. Wehner, Dallas, Tex.
(1109 Janwood Circle, Plano, Tex.)
Filed Dec. 26, 1961, Ser. No. 162,077
5 Claims. (Cl. 128—172.1)

This invention pertains to an improved electro-aerosol generator. More particularly, the invention relates to a portable electro-aerosol generator for inhalation therapy with unipolarly charged electro-areosols and other purposes such as physiological and bioclimatological research. Some recent experiments conducted at the University of California under the auspices of Naval Research have proven conclusively that certain living tissue respond favorably to negative air ions. Conversely, in the presence of positive air ions this same tissue showed repressed activity. For example, the cilia, small hair-like projections lining the trachea are stimulated by the presence of negative air ions and increase their activity. This expels mucus, dust, bacteria, and other foreign matter from the respiratory tract and prevents infections and obstructions and aids healing processes. In this manner, the foreign objects, such as pollen, etc., do not cause respiratory difficulties. While past air ionization means have been fairly successful, they have to rely on dust and other impurities of the air to carry the air ions to their intended destination. By using such impurities in the air as vehicle for the electric charges, the conditions of the respiratory tract have not been alleviated as rapidly as they might be.

Electro-aerosols have been used with remarkable success in ten countries, particularly Germany and Russia, in the treatment of various diseases. This is especially true of diseases of the respiratory system, allergies, rheumatism, and nervous conditions. The beneficial effect of the electro-areosol therapy is achieved primarily by the biological effects of electric charges. The charges have a cellular, local level effect as well as a central effect on the autonomic system. Affected, for instance, are hormone and enzyme activities with ensuing secondary effects, cell membrane permeability and other biological functions. Electro-aerosol therapy enjoys the considerable advantage over artificially ionized air to have as a carrier of the electric charge water or aqueous solution which, by itself, has a well proven beneficial effect on the living tissue to be treated. The carrier, or vehicle, has in the case of ionized air, at best, indifferent effects on the tissue.

In my invention I use microdroplets as a physiologically superior vehicle for the transport of electric charges into the organism (lungs) compared with air ionizers, depending on air contaminants such as microscopic dust particles as vehicle. Particularly in diseases of the respiratory tract is it desirable to transport water or other suitable liquids into the affected areas for a better bronchial toilet, liquification of mucus, sedative effect of hypotonic solutions, etc. Past electro-aerosol generators have been bulky, immobile units. Due to different design principles, they have been expensive and because of the relatively large size have been confined to locations. This meant the patient seeking the benefits of electro-aerosol treatment had to travel to the generator.

Accordingly, it is an object of this invention to provide an electro-aerosol generator which is portable. It is a further object of this invention to provide an electro-aerosol generator not requiring air compressing equipment and other elaborate installation. It is a further object of this invention to provide a portable electro-aerosol generator such that the electric charge is carried by a vehicle which has a beneficial effect on the cell tissue to be treated by said electro-aerosol therapy. It is a further object of this invention to provide a unipolarly-charged droplet as a compatible vehicle for a more stable aerosol. It is a further object of this invention, for a better utilization of the aerosol, to create a favorable electrostatic potential between the source of the unipolarly-charged droplets and the person (representing ground) or tissue to receive the benefits thereof. These and other objects will become apparent as the description of the invention proceeds.

For a more complete understanding of the present invention and for further objects and advantages thereof, reference may now be had to the following description taken in conjunction with the accompanying drawings in which:

FIGURE 1 schematically illustrates a novel electro-aerosol generator constructed in accordance with the teachings of the subject invention;

FIGURE 2 illustrates a modified form of an electro-aerosol generator with electrical heat means; and FIGURE 3 illustrates the nozzle portion of the electro-aerosol generator of the type of either FIGURE 1 or FIGURE 2 but having the added features of ionization promotion means and auxiliary charging means.

The invention discloses an apparatus which facilitates the generation of unipolarly-charged electro-aerosols as employed in electro-aerosol therapy. It consists of a liquid reservoir having an opening or nozzle to direct the electro-aerosol toward the inhaling person. By suitable means, the liquid in the reservoir is electrically charged and brought to a boil. The molecules escaping from the liquid will themselves be electrically charged. To enhance this charge a high voltage grid may be inserted in the vapor stream. This is not necessary, however. The discharging vapors then will condense to form small electrically charged droplets. This condensation can be readily seen by any present-day vaporizer. However, such vaporizers do not have the beneficial effects of electro-aerosol therapy as the present invention does. The advantages of this invention compared with presently employed electro-aerosol generators are that suitable unipolarly-charged electro-aerosols are available without the use of auxiliary systems, such as compressed air sources. In addition, these electro-aerosols are very stable since the mutually repellent forces of unipolar electric charges prevent the coalescense and resulting rapid sedimentation of the droplets. Since the liquid being used is by itself a well proven remedy in respiratory diseases, and for reasons described above, electro-aerosol therapy as administered with this invention has significant technical, physical and therapeutic advantages over presently employed methods.

The invention is described in detail below. Into liquid reservoir 1 is introduced a liquid 3 which is compatible with the living tissue to be treated. In most cases this will be pure water or diluted aqueous solutions. Suitable organic additives for the water are, for instance, propylene glycol, glycerine, ethereal oils, or other medicated or aromatic solutions, emulsions or suspensions. The concentration of such solutions will be generally below five percent (5%) of the additive and about ninety-five percent (95%) water. For ease in adding the material a cap 4 for the liquid reservoir 1 can be provided. This cap should contain a vapor escape nozzle 5, preferably one which is directional. By that is meant one which will impart a direction to the vapors when they escape from the reservoir. This is for improved control in insuring the unipolarly-charged droplets to proceed to the living tissue to be treated. By this living tissue to be treated is meant living organisms. These living organisms run the gamut from the simplest, which it is desired to treat, such as cells, through the most complex, such as the human being. A suitable heat source such as candle 6 is provided below reservoir 1 and spaced to conduct heat to the liquid 3 therein. By suitable heat source is meant such heat sources as a natural gas burner, alcohol burner, propane burner, electrical heat means, or other heat means. These have the advantage that they may be electrically insulated from the liquid reservoir and thus not afford a conducting path from this reservoir.

One embodiment of the invention is illustrated schematically in FIGURE 1. Alternate ways of heating the liquid come readily to mind, such as that in FIGURE 2 wherein the inductive heating units, electrodes 20, are immersed in the liquid to be vaporized. To insure electrical isolation, an isolation transformer 21 whose coils are separated by suitable insulation, for example up to 40,000 volts insulation thickness, can be used as a heater with a normal 115 volt alternating current power source.

Alternate methods of heating suggest themselves to the one skilled in the art such as blowing hot air on the container or circulating a hot nonconducting oil through the liquid to be vaporized or by using a heat lamp or a source of infra-red energy. These heating means are given by way of illustration and not by way of limitation.

Boiling or vaporizing the material can also be accomplished by sonic energy. That is sonic or ultrasonic vibrations can be used to liberate the vapor particles from the liquid. I have found, however, that heat is a simpler and more preferred method of effecting boiling.

It is necessary to ensure a unipolar charge on the vapors. To do this, plate 7 is connected by a conducting means to a high voltage D.C. generator 2 affording from 4000 to 40,000 volts, depending upon the amount of unipolar charge desired. Inadequate unipolar charges result from electrostatic fields of lower potential. To prevent the high voltage from becoming dangerous, I install a limiting resistor R of such magnitude to limit the current flow to safe amounts. For example, if the high voltage generator supplies 4,000 volts, it may be necessary to install a resistance of 4 megohms to limit the current flow to one milliampere. It has been generally found that there is corona discharge associated with the high voltages from 30,000 to 40,000 volts. Therefore, I prefer to work in the range of from 4,000 to 20,000 volts. It will be at once obvious to one skilled in the art of electrical engineering that the unipolar charge can be imparted in other ways.

A charged screen may be used in addition to the charging of the liquid. An alternate embodiment utilizing an auxiliary charging screen is shown in FIGURE 3. In FIGURE 3 the vapors 30 travel past the radioactive source 32, such as tritium, polonium or cesium, and are ionized. By placing a suitable charged screen 34 in the path of the issuing vapors, the desired unipolar charge of the electro-aerosol may be achieved. It should be noted in the latter case that the degree of electrostatic charge is much lower on the screen than is necessary to former cases because of the previous ionization by the radioactive energy.

Although the possible current is kept at safe low levels by the limiting resistor, an additional safety factor may be added by providing a nonconducting shield such as mica or high-temperature nonconducting plastics around the vessel. This can be conveniently designed in form of a supporting structure. Provision of handles will help to increase the portability of the instrument. Throughout this application the term "liquid" has been referred to on numerous occasions. It will be readily understood that this term is intended to cover a liquid which has been absorbed by a solid, as upon its surfaces, and that is vaporizable in accordance with the previously stated teachings of this specification.

The above description of the invention is given by way of illustration only. Alternate embodiments readily suggest themselves to the one skilled in the art and are within the scope of the appended claims.

What is claimed is:

1. An electro-aerosol generator comprising:

(a) an insulated container having a liquid cavity, (b) a liquid in the cavity of said container capable of receiving a unipolar charge, (c) a grounded D.C. source of high electrical potential, (d) means connecting said source with the liquid in said container, (e) means for supplying sufficient heat to the liquid in said container to vaporize said liquid by boiling, and (f) directional means for said container adapted to direct charged vapor particles therefrom.

2. The electro-aerosol generator of claim 1 wherein the electrical potential source is at a potential as high as about 4,000 volts but no higher than about 40,000 volts.

3. The electro-aerosol generator of claim 1 further comprising a resistance in the means connecting said source of high electrical potential to the liquid in said container.

4. The electro-aerosol generator of claim 1 further comprising electrically charged screen means adjacent to said directional means for imparting additional charge to vapor and liquid droplets issuing therefrom.

5. The electro-aerosol generator of claim 4 further comprising ionization promotion means active above the liquid but prior to the outlet of said directional means.

References Cited by the Examiner

UNITED STATES PATENTS

| | | | |
|---|---|---|---|
| 743,306 | 11/03 | Merwin | 128—172.1 |
| 1,984,159 | 12/34 | Schwedenberg et al. | 317—4 |
| 2,284,235 | 5/42 | Ronzi | 128—172.1 |
| 2,288,416 | 6/42 | O'Neill | 128—172 |
| 2,625,590 | 1/53 | Peeps | 317—3 |
| 2,934,648 | 4/60 | Leupin et al. | 250—44 |

RICHARD A. GAUDET, *Primary Examiner.*

JORDAN FRANKLIN, *Examiner.*

UNITED STATES PATENT OFFICE
CERTIFICATE OF CORRECTION

Patent No. 3,194,236                                        July 13, 1965

Alfred P. Wehner

It is hereby certified that error appears in the above numbered patent requiring correction and that the said Letters Patent should read as corrected below.

Column 2, line 62, for "about" read -- above --.

Signed and sealed this 15th day of February 1966.

(SEAL)
Attest:

ERNEST W. SWIDER                                   EDWARD J. BRENNER
Attesting Officer                                       Commissioner of Patents